US010521986B1

United States Patent
Ho (10) Patent No.: US 10,521,986 B1
(45) Date of Patent: *Dec. 31, 2019

(54) SECURE TRANSPORT DEVICE (71) Applicant: TP Lab, Inc., Palo Alto, CA (US)

(72) Inventor: Chi Fai Ho, Palo Alto, CA (US)

(73) Assignee: TP Lab, Inc., Palo Alto, CA (US)

(*) Notice: Subject to any disclaimer, the term of this patent is extended or adjusted under 35 U.S.C. 154(b) by 113 days.

This patent is subject to a terminal disclaimer.

(21) Appl. No.: 15/912,433

(22) Filed: Mar. 5, 2018

Related U.S. Application Data (63) Continuation of application No. 15/486,365, filed on Apr. 13, 2017, now Pat. No. 9,940,765, which is a continuation of application No. 14/696,379, filed on Apr. 25, 2015, now Pat. No. 9,654,481.

(51) Int. Cl.
*H04L 29/06* (2006.01)
*G07C 9/00* (2006.01)
*H04L 9/32* (2006.01)
*G06F 21/62* (2013.01)

(52) U.S. Cl.
CPC ..... *G07C 9/00126* (2013.01); *G06F 21/6218* (2013.01); *H04L 9/32* (2013.01)

(58) Field of Classification Search
CPC .. H04L 63/107; H04L 63/0428; H04L 63/062
See application file for complete search history.

(56) References Cited

U.S. PATENT DOCUMENTS

| | | | | |
|---|---|---|---|---|
| 8,832,374 B1* | 9/2014 | Schaefers | ........... | H04L 67/1097 711/115 |
| 9,313,332 B1* | 4/2016 | Kumar | ................ | H04M 3/5232 |
| 9,558,121 B2* | 1/2017 | Zei | ....................... | G06F 12/0846 |
| 10,291,550 B2* | 5/2019 | Chen | ....................... | H04L 49/25 |
| 2013/0311737 A1* | 11/2013 | Shaw | .................... | G06F 21/305 711/163 |

* cited by examiner

*Primary Examiner* — Mahfuzur Rahman
(74) *Attorney, Agent, or Firm* — North Shore Patents, P.C.; Michele Liu Baillie (57) ABSTRACT

A secure transport device includes a hardware storage, a physical lock coupled to the hardware storage, a data storage residing within the hardware storage, the data storage comprising a destination location comprising a first geophysical location, processor(s), and a computer readable medium comprising programming instructions. The data storage includes a destination location that includes a first geophysical location. Execution of the programming instructions causes the processor(s) to: receive an access request to access the hardware storage; obtain a current location of the secure transport device, the current location including a second geophysical location; and compare the first geophysical location to the second geophysical location. Upon determining that the second geophysical location matches the first geophysical location, a command is sent to unlock the physical lock to allow access to the hardware storage, and the access request and the current location are stored in the data storage.

18 Claims, 4 Drawing Sheets

SECURE TRANSPORT DEVICE

BACKGROUND OF THE INVENTION

Field

This invention relates generally to security, and more specifically, to a secure transport device.

Related Art

People have been storing important or valuable objects and documents in sentry boxes, safes, safe deposit boxes, or safe rooms. These containers provide strong physical protection to prevent theft of the content inside the containers. They are often secured physically to a fixture or building structure. Better locks, improved materials and more secure procedures have been developed over time. However, things are changing in past several decades, particularly changes regarding the important and valuable content people want to protect.

More and more information and documents are now created and stored digitally. Many important documents like birth certificates, vehicle registration, passwords, wills, medical records, personal financial records are now in digital form. Many electronic documents or assets are valuable, such as family photos, manuscripts, writings, and digital paintings. These important or valuable electronic objects or documents cannot be stored or secured in the same manner as with a sentry box or a safe deposit box. Today, we store them in a network computer in a public or private network provided by a service provider, or store them in our computers. The safety provided by a sentry box or a safe deposit box is not available for these computers. Once a computer is stolen or hacked, the information stored in the computer is subject to theft.

It would be desirable for a bank, for example, to allow Mary to store her electronic will that can only be accessed in the bank. In another situation, John has many online accounts and creates an electronic document file storing all the passwords of the accounts. John stores the password file in his laptop computer. John wants to be sure the password file will be safe. John wants his laptop computer to only be able to review the password file while located in his home office. In a similar way, John owns a jewelry shop and maintains an important client list. John wants the client list be accessible only in his shop. This way, John can prevent any employee in his shop from accessing the client information even if the client list document file is stolen and taken outside the shop.

In a different situation, Mary's employer allows Mary to use her mobile phone to access corporate financial documents. The employer requires the financial documents only be accessible by her mobile phone when Mary is in the office.

The above scenarios illustrate the need to provide security for electronic data using location information.

BRIEF SUMMARY OF THE INVENTION

According to one embodiment of the present invention, in a method for secure data access, a secure data device receives a data access request to access secured data stored in a storage of the secure data device. A location module of the secure data device calculates a current location of the secure data device. A secure data module of the secure data device compares the current location and a pre-stored location stored in the secure data device. Upon determining that the current location matches the pre-stored location, the secure data module retrieves the secure data from the storage and processes the secure data.

In one aspect of the present invention, the pre-stored location comprises a location where the secured data is served by the secure data device.

In one aspect of the present invention, the pre-stored location comprises one or more of the following: a geophysical location; a map coordinate; a landmark location; a location within a building; and a relative location to an object external to the secure data device.

In one aspect of the present invention, the pre-stored location comprises one or more of the following: a network access point name; a wireless network name; a cellular base station identity; and a MAC address.

In one aspect of the present invention, in calculating the current location of the secure data device, the location module queries a network computer for the current location using the received information.

In one aspect of the present invention, the pre-stored location comprises a distance range, and the secure data module determines whether the current location is within the distance range from the pre-stored location.

In one aspect of the present invention, the processed secure data is sent as available data in response to the data access request.

In one aspect of the present invention, upon determining that the current location does not match the pre-stored location, the secure data module retrieves the secure data and processes the secure data in a manner that renders the available data unusable.

In one aspect of the present invention, the secure data is encrypted. The secure data module obtains a secure key and decrypts the secure data using the secure key.

In one aspect of the present invention, the secure data module decrypts the secure data using the secure key with the current location or the pre-stored location.

In one aspect of the present invention, a secure key is obtained and an available data is encrypted using the secure key to generate the secure data. The secure data is stored in the storage.

In one aspect of the present invention, the storage is determined to comprise a pre-stored secure data, and the pre-stored secure data is modified using the secure data.

System and computer program products corresponding to the above-summarized methods are also described and claimed herein.

BRIEF DESCRIPTION OF THE SEVERAL VIEWS OF THE FIGURES

FIG. 2 illustrates

DETAILED DESCRIPTION OF THE INVENTION

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
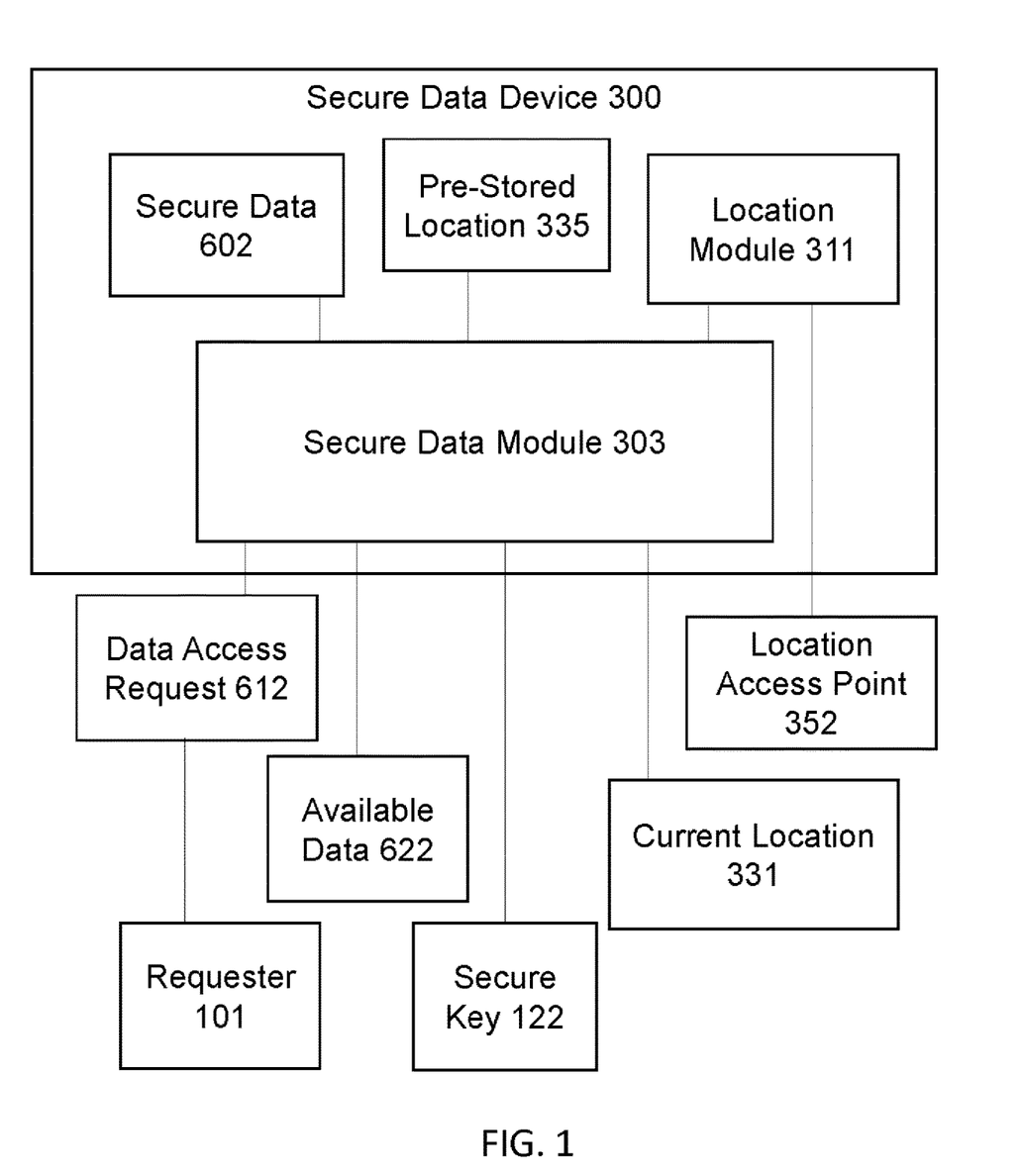
FIG. 1 illustrates an exemplary embodiment of a secure data device servicing a request to access a piece of stored data according to the present invention.

FIG. 1 illustrates an exemplary embodiment of a secure data device servicing a request to access a piece of stored data according to the present invention. In one embodiment, secure data device 300 includes secure data 602, which can be accessed by a requester 101.

In one embodiment, secure data 602 includes a document, a spreadsheet, a database, a software application, an image or picture, a piece of audio or video data, an electronic book, a voice message, an electronic mail or message, a file, a file folder, a name, a credit card identity, a password, an instruction, a confidential document, a name, a company-owned data, a medical record, or a piece of digitally encoded data. In one embodiment, secure data 602 is of importance to requester 101. In one embodiment, secure data device 300 includes a plurality of storage units, and secure data 602 is stored across the plurality of storage units. In one embodiment, secure data 602 is stored in an encrypted format. In one embodiment, secure data 602 is stored in a secure storage module, which may be secured with a physical lock.

In one embodiment, secure data device 300 includes pre-stored location 335 which indicates a location where secure data 602 can be served by secure data device 300. In one embodiment, pre-stored location 335 includes one or more locations, which may include a geo-physical location, a map coordinate, a street address, a street name, a city name, a landmark location, a building name, a store name, a floor number, a room number, a cubical number, a district, a train station, a campus location, a relative location to an object external to the secure data device 300 such as a landmark, a network access point, a base station, a vehicle. In one embodiment, a location includes an identity of a shop, a network access point name, a wireless network name such as SSID, PAN-ID, a cellular base station identity, or a MAC address. In one embodiment, a location refers to a section of a train at the $3^{rd}$ street of San Francisco, the main dining hall in the $2^{nd}$ deck of a cruise at South China sea near Hong Kong, the trunk of a truck connecting to 3 wireless access points at the loading dock of Oakland port; within a radius of 15 meters from a Starbucks coffee shop in downtown Seattle; a safe deposit room in Bank of America on Fremont Boulevard in city of Sunnyvale Calif., a house at a street address, a closet in the master bedroom, a coordinate in a museum map and being connected to 12 wireless network access points.

In one embodiment, secure data device 300 includes location module 311 which is used by secure data device 300 to determine a current location 331. In one embodiment, location module 311 is coupled to an external location access point 352. In one embodiment, location access point 352 is a network access point such as a wireless access point, a cellular base station, a network switch, a base station for 802.11 WiFi, wireless personal area network such as 802.15.4, ZigBee, a wireless signal transmitting device, a Bluetooth device, or a Near Field Communication (NFD) device. In one embodiment, location access point 352 transmits an access point identity, a network address such as a MAC address, or a network identity such as SSID, PAN-ID, allowing location module 311 to determine a location. In one embodiment, location access point 352 transmits a wireless signal allowing location module 311 to determine a strength of the transmitted signal and to determine a location. In one embodiment, location access point 352 includes a location and transmits its location to location module 311.

In one embodiment, location module 311 determines current location 331 based on information received from location access point 352. In one embodiment, location module 311 receives a location from location access point 352 and determines current location 331 as the received location. In one embodiment, location module 311 receives an access point identity, a network address or a network identity from location access point 352, and treats the received information as current location 331. In one embodiment, location module 311 queries a network computer using the received information, which will be explained further later in this specification, to determine current location 331. In one embodiment, location module 311 includes a database or a datastore and location module 311 looks up the current location 331 from the database or datastore using the received access point identity, network address, or network identity.

In one embodiment, location access point 352 includes a plurality of location access points. Location module 311 receives a plurality of information from the plurality of location access points. In one embodiment, location module 311 calculates current location 331 using the received plurality of information. Such calculating may include triangulation, selection of one out of many, or selection of a plurality of locations applied to the received plurality of information. In one embodiment, location module 352 determines current location 331 to include two or more locations as illustrated previously.

In one embodiment, requester 101 submits a data access request 612 to access secure data 620 to the secure data device 300. Requester 101 may be a human user, a machine, a computing device, a robot, or a network computing device. Requester 101 may submit data access request 612 through an input device such as a mouse, a pointing device, a keyboard, a touch screen, a gesture, a voice question, waiving a hand, a body gesture, or other input peripheral device, or sensor associated with the input device. In one embodiment, secure data module 303 of secure data device 300 receives and processes data access request 612. The secure data module 303 obtains current location 331 of secure data device 300 from the location module 311 and matches current location 331 against pre-stored location 335. In one embodiment, secure data module 303 determines there is a match of current location 331 and pre-stored location 335; secure data module 303 retrieves secure data 602 and converts secure data 602 to available data 622. Secure data module 303 provides available data 622 to requester 101.

In one embodiment, secure data module 303 compares a geo-physical location of pre-stored location 335 to a geo-physical location of current location 331. In one embodiment, secure data module 303 compares a street address of pre-stored location 335 to a street address of current location 331. In one embodiment, secure data module 303 compares a building or a store name of pre-stored location 335 to a building or a store name of current location 331. In one embodiment, secure data module 303 compares a map coordinate of pre-stored location 335 to a map coordinate of current location 331. In one embodiment, secure data module 303 compares a floor, room or cubicle number of pre-stored location 335 to a floor, room or cubicle number of current location 331. In one embodiment, secure data module 303 compares a location inside a house of pre-stored location 335 to a location inside a house of current location 331. In one embodiment, secure data module 303 compares pre-stored location 335 the same location format as current location 331. In one embodiment, secure data module 303 converts pre-stored location 335 and current location 331 to a same location format prior to comparing. In one embodiment, pre-stored location 335 includes a radius or a distance range, and secure data module 303 determines whether the current location 331 is within the radius or distance range from the pre-stored location 335.

In one embodiment, pre-stored location 335 includes a plurality of pre-stored locations, and secure data module 303 compares the plurality of pre-stored locations 335 with a plurality of current locations 331. In one embodiment, pre-stored location 335 includes one or more location access point information such as identity, network address, network name, signal strength. Secure data module 303 compares the one or more location access point information of pre-stored location 335 against similar one or more location access point information of current location 331.

In one embodiment, secure data module 303 determines there is a match between pre-stored location 335 and current location 331. Secure data module 303 proceeds to retrieve and to process secure data 602. In one embodiment, secure data module 303 generates or displays an indication on secure data device 300 in order to indicate success of matching pre-stored location 335 and current location 331. In one embodiment, the indication is to make a sound, to activate a green LED light, to display a message, or to play an audio or video clip.

In one embodiment, secure data module 303 determines there is no match between pre-stored location 335 and current location 331. In one embodiment, secure data module 303 does not retrieve secure data 602. Secure data module 303 may generate an error message for requester 101, generate an error indication for secure data device 300, or display an error indication on an output peripheral (not shown) such as display, speaker, a sound generator, a light, a LED light of secure data device 300, in order to indicate failure of data access request 612. In one embodiment, secure data module 303 retrieves secure data 602 but does not process secure data 602 correctly. In other words, the secure data 602 is processed in a manner that renders the available data 622 unusable. In one embodiment, secure data module 303 provides a random piece of data as the available data 622, thus essentially not allowing requester 101 to access secure data 602. In one embodiment, secure data module 303 sends an alarm message to a network computer, to a law enforcement server, to dispatch a security guard, to make an emergency phone call, to activate a lock, to a camera to take a picture, or to record a video.

In one embodiment, secure data module 303 determines the number of failed data access requests exceeds a pre-determined number, and secure data module 303 does not process any future data access requests.

In one embodiment, secure data module 303 retrieves secure data 602 and converts secure data 602 into data 622. In one embodiment, secure data 602 is encrypted. Secure data module 303 obtains secure key 122 so as to decrypt secure data 602. In one embodiment, secure data module 303 obtains secure key 122 from requester 101. Requester 101 may supply secure key 122 as a password or a key the requester 101 obtained from a secure identity device. In one embodiment, secure data module 303 obtains secure key 122 from secure data device 300, where secure data device 300 stores secure key 122 in a data storage module or unit. In one embodiment, secure data module 303 includes a security module, which may be software or hardware module, and secure data module 303 uses the security module to decrypt secure data 602 based on secure key 122. Usage of various cryptography techniques is known to those skilled in the art and is not further described here.

In one embodiment, secure data 602 is protected by a physical lock included in secure data device 300. The physical lock may be a physical latch attached to a hardware data storage of secure data device 300, or a physical connector to the hardware data storage. Secure data module 303 may issue a command to unlock the physical lock, allowing secure data device 300 to enable access to the hardware data storage. Subsequently secure data module 303 retrieves secure data 602.

In one embodiment, secure data 602 is a piece of data to unlock a physical lock or a physical latch. In one embodiment, secure data 602 includes a combination lock number, a password, or an instruction to instruct secure data device 300 to unlock the physical lock or latch.

In one embodiment, secure data 602 is not encrypted and secure data module 303 copies secure data 602 to available data 622.

In one embodiment, secure data device 300 converts secure data 602 using current location 331 or pre-stored location 335. In one embodiment, secure data device 300 uses current location 331 or pre-stored location 335 as secure key 122, and uses secure key 122 to convert secure data 602. In one embodiment, secure data device 300 combines secure key 122 and current location 331 or pre-stored location 335 to generate a different secure key and uses the generated secure key to convert secure data 602. In one embodiment, current location 331 is not the proper location in which to access secure data 602; as a result, the generated available data 622 does not show a piece of data expected by the requester 101. In this embodiment, generated available data 622 may not be legible, may contain patterns not recognizable by requester 101, may not be displayable, or may contain audio/video not decipherable by requester 101. In one embodiment, generated available data 622 may contain benign information misleading requester 101 that requester 101 has proper access to secure data 602.

In one embodiment, secure data module 303 presents available data 622 on an output peripheral of secure data device 300 such as a display, an audio speaker, a light indicator, or any output module. In one embodiment, secure data module 303 presents available data 622 onto a network module of secure data device 300, a data interface connector such as a USB interface, a HDMI interface, a DVI interface, a Firewire interface, or other interface allowing data 622 to be transferred via the interface.

In one embodiment, secure data module 303 presents available data 622 to secure data device 300 to unlock a physical lock or a latch.

Figure 2:
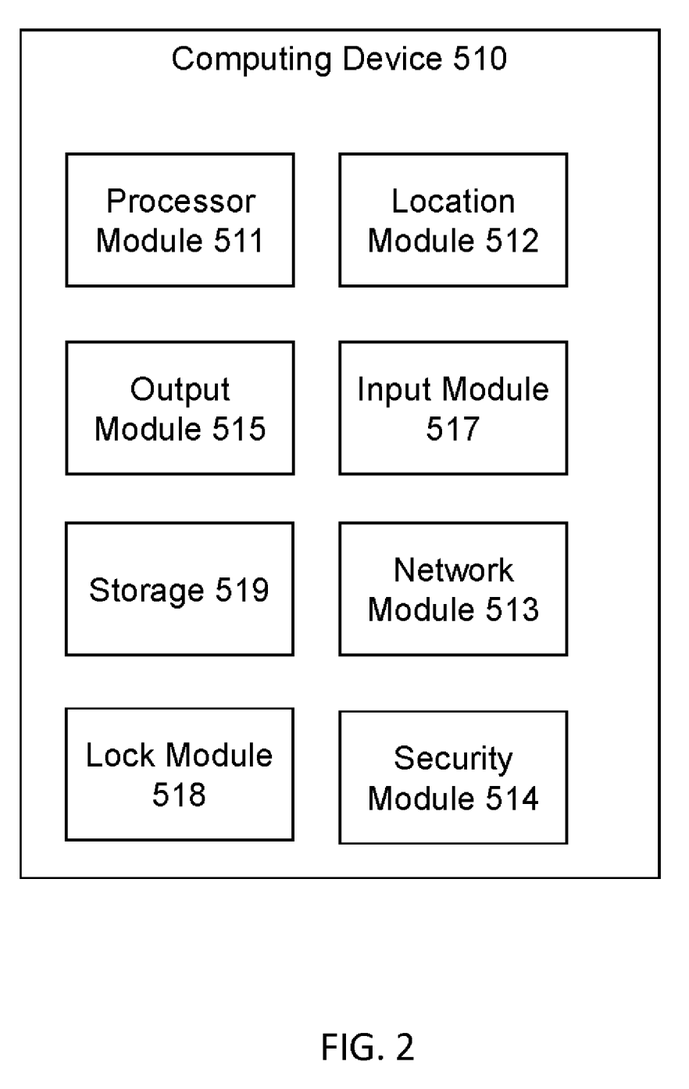
FIG. 2 illustrates an exemplary embodiment of hardware components of a computing device which can be used as a secure data device or a network computing device according to the present invention.

FIG. 2 illustrates an exemplary embodiment of hardware components of a computing device which can be used as a secure data device or a network computing device according to the present invention. In one embodiment, computing device 510 includes a processor module 511, an output module 515, an input module 517, storage 519, a network module 513, a security module 514 and a location module 512. In one embodiment, processor module 511 includes one or more general processors, a multi-core processor, an application specific integrated circuit based processor, a system on a chip (SOC) processor or an embedded processor. In one embodiment, output module 515 includes a display for displaying images and text, an audio speaker, an image projector, one or more light indicator, data interfaces such as USB, HDMI, DVI, DisplayPort, Firewire, thunderbolt, or other forms of computer output. In one embodiment, input module 517 includes a physical or logical keyboard, buttons, keys, microphones, sensors such as optical sensor, infrared (IR) sensor, camera sensor, motion sensor, direction sensor, any sensor that may be used to provide input to computing device 510. In one embodiment, storage 519 includes a computer readable medium not including is signals per se, such as a main memory, a hard disk drive (HDD), a solid state drive (SSD), a memory card, a ROM module, a RAM module, a USB disk, a storage compartment, a data storage component or other storage component. In one embodiment, network module 513 includes hardware and software to connect to a data network such as Ethernet, a wired network, a wireless network, a cellular network, a mobile network, a Bluetooth network, a NFC network, a personal area network (PAN) or a WiFi network. Storage 519 includes programming instructions, which when executed by the processor module 511 of computing device 510, implements one or more functionalities of the present invention. In one embodiment, location module 512 includes a GPS module, a wireless signal sensor, or a processor to calculate a location based on received location signals. In one embodiment, location module 512 connects to network module 513 to use network module 513 to obtain signals of one or more network interfaces. In one embodiment, location module 512 connects to network module 513 to send a query to a network computer to determine a location based on received signals. In one embodiment, location module 512 connects to processor module 511 so as to use process module 511 to calculate or determine a location based on received signals. In one embodiment, security module 512 includes a hardware encryption/decryption component. In one embodiment, security module 512 includes a plurality of software programming instructions, which when executed, performs encryption or decryption functionality.

In one embodiment, computing device 510 includes a lock module 518, which may include a lock, a mechanical latch, a digital lock, a locked container, a locking subsystem, or an authentication subsystem. In one embodiment, the lock of lock module 518 can be unlocked by processor module 511 executing one or more instructions. In one embodiment, lock module 518 is activated by processor module 511 executing one or more instructions to unlock the lock module 518, to unlock a lock or a latch, or to authenticate a user. In one embodiment, a locking subsystem of lock module 518 includes a container for valuable goods such as jewelries, cash, coins, or collectables; or important documents such as wills, contracts, or deeds. In one embodiment, the locking subsystem is unlocked by processor module 511 upon executing one or instructions. In one embodiment, the locking subsystem requires a user to provide additional security information. In one embodiment, an authentication subsystem of lock module 518 is activated by processor module 511 executing one or more instructions. In one embodiment, the authentication subsystem is activated to authenticate a user or a request.

In one embodiment, computing device 510 does not need to have all illustrated modules. In one embodiment, computing device 510 does not have input module 517 or output module 515. In one embodiment, computing device 510 does not have location module 512 or network module 513. In one embodiment, computing device 510 connects to an external output module 515 or an external input module 517.

In one embodiment, secure data device 300 is a computing device. In one embodiment, secure data device 300 is implemented in a personal computer, a laptop, a smartphone, a safe deposit box, a safe deposit box for digital data, a cashier device, a wearable computing device, a smart medical device, a jewelry box, a medical device, a robot, a hard-disk drive, a USB drive, a memory card device, a camera, a lock, a corporate phone, a locker, a sentry box, or any device providing storage space or data storage.

Figure 3:
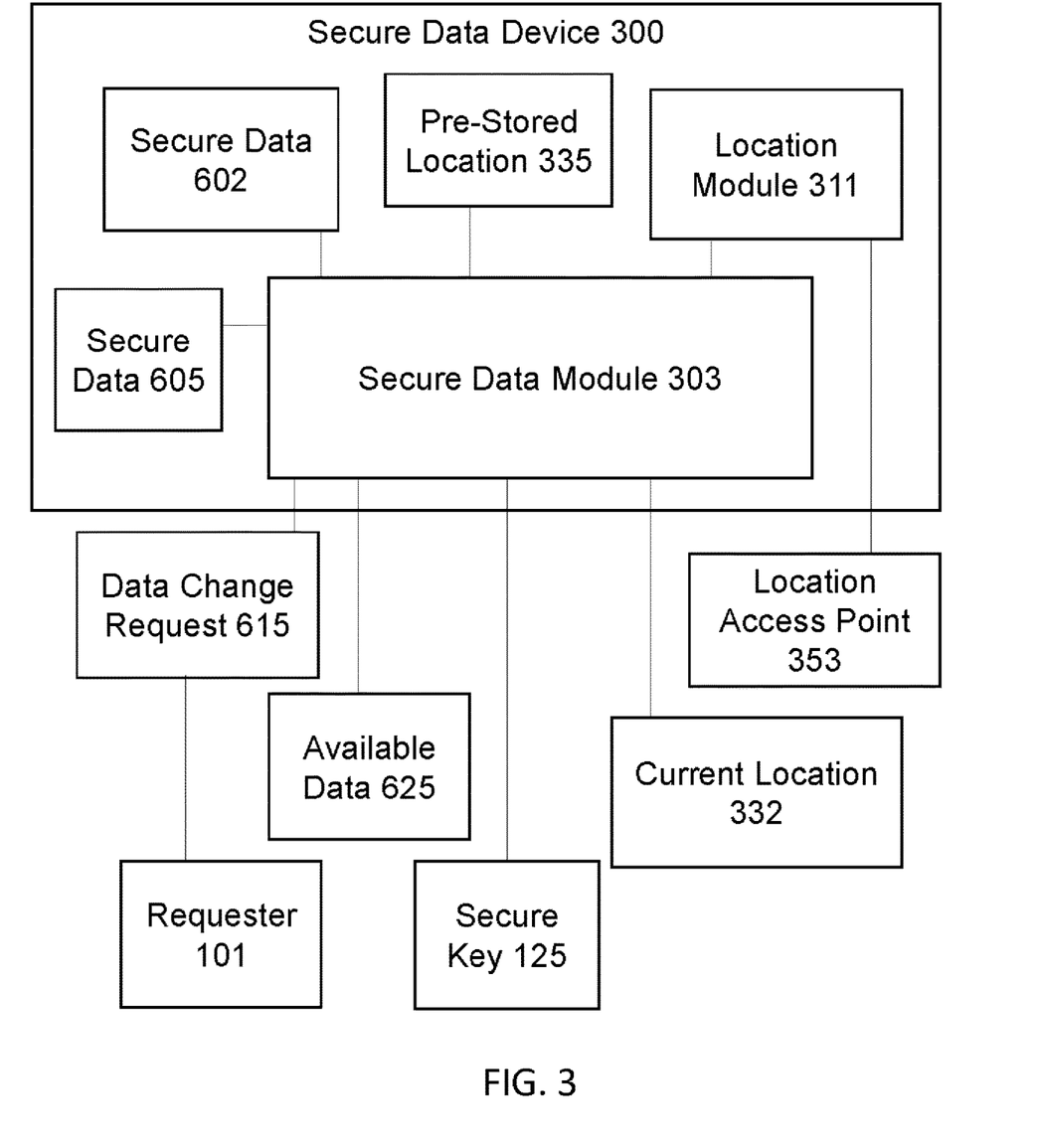
FIG. 3 illustrates an exemplary embodiment of storing data in a secure data device according to the present invention.

FIG. 3 illustrates an exemplary embodiment of storing data in a secure data device according to the present invention. In one embodiment, secure data module 303 receives a data change request 615 and data 625 from requester 101.

In one embodiment, secure data module 303 obtains current location 332 using location module 311, as illustrated in FIG. 1, optionally based on location access point 353. In one embodiment, secure data module 303 matches pre-stored location 335 against current location 332 to determine if there is a match. In one embodiment, secure data module 303 determines there is no match between current location 332 and pre-stored location 335; as a result, secure data module 303 does not store available data 625. In one embodiment, secure data module 303 generates an error indication.

In one embodiment, secure data module 303 determines there is a match between current location 332 and pre-stored location 335. In one embodiment, secure data module 303 obtains secure key 125, in a process illustrated in FIG. 1. Secure data module 303 generates secure data 602 from available data 625, using secure key 125 and optionally pre-stored location 335 or current location 332. In one embodiment, secure data 602 is encrypted from available data 625 by a security module of secure data device 300 based on secure key 125 and optionally pre-stored location 335 or current location 332.

In one embodiment, secure data 602 is previously stored in secure data device 300. Secure data module 303 modifies secure data 602 to include secure data 605.

Secure data device 300 does not have to include secure data 602. In one embodiment illustrated in FIG. 4, secure data device 300 connects to data network 500 and obtains secure data 602 from data server 202 via data network 500. In one embodiment, secure data device 300 sends secure data 602 to data server 202 for storage.

Figure 4:
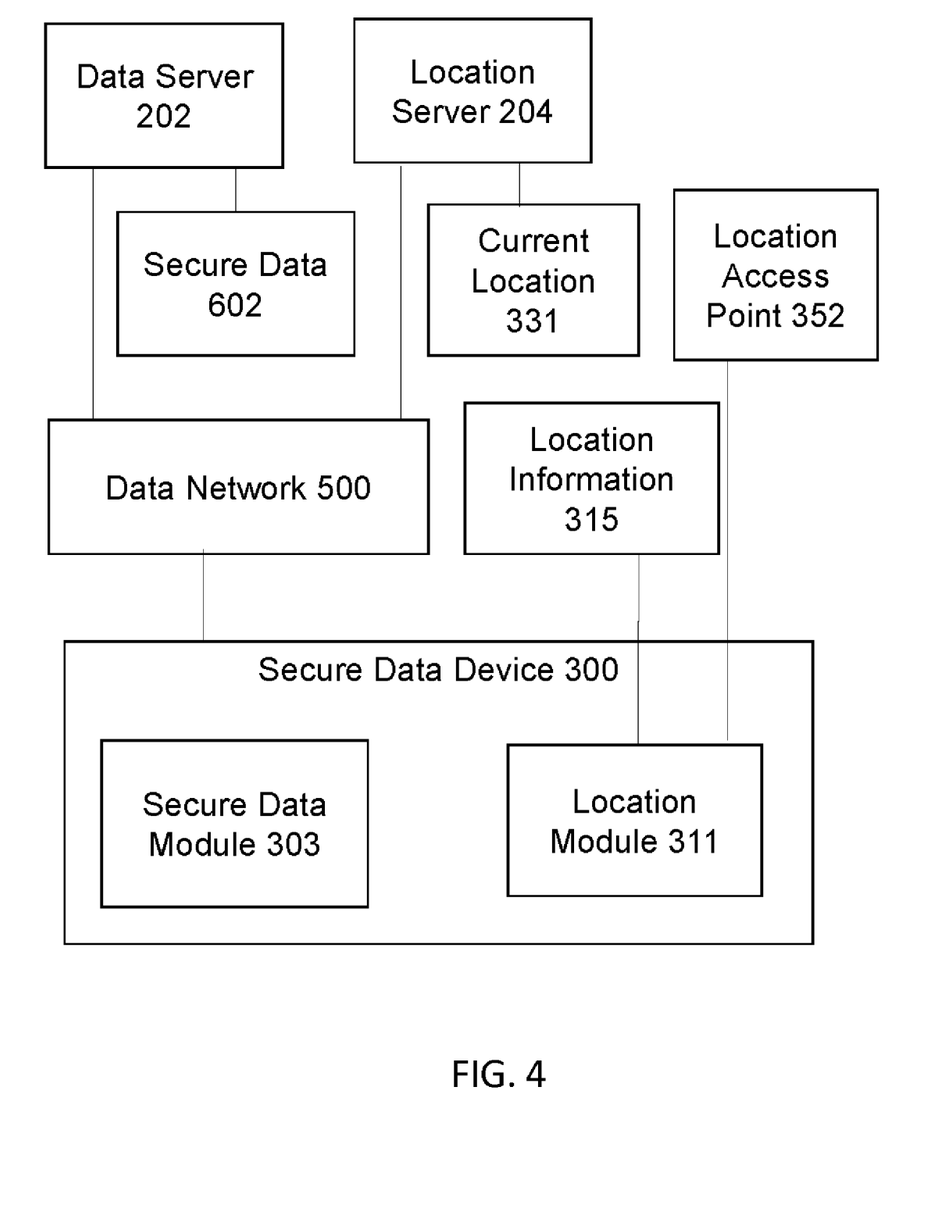
FIG. 4 illustrates an exemplary embodiment of a secure data device accessing data from a data network according to the present invention.

In one embodiment also illustrated in FIG. 4, location module 311 determines current location 331 by querying location server 204 via data network 500. In one embodiment, location module 311 sends location information 315, which may contain information related to location access point 352 or GPS information, to location server 204. Location server 204 calculates current location 331 based on location information 315 and sends current location 331 to location module 311.

In one embodiment, location information 315 includes a location. Location server 204 converts the location in location information 315 to current location 331. In one embodiment, location in location information 315 is a geo-physical location and location server 204 converts the geo-physical location into a street address, a store name, a building name, or other location format. In one embodiment, location server 204 converts a location access point identity or network address included in location information 315 into a geo-physical location, a floor number or other location format. In one embodiment, location server 204 performs a triangulation calculation based on signal information included in location information 315. In one embodiment, location server 204 looks up a facility map to determine current location 331 within a building structure or an area, such as a room number, a room, a cubical, a hallway, a deck number, a dining hall, a location inside a vehicle or a vessel, or a campus location. In one embodiment, current location 331 includes a plurality of locations such as a street address and a floor number, a geo-physical location with a radius and a room number, or any combination of locations requested by location module 311.

In one embodiment, pre-stored location is configured by a user (possibly a different user from the user accessing secure data), pre-set during manufacturing process, or pre-set by a retailer or service provider offering the secure data device product or service.

Secure data device can be deployed in a number of embodiments. In one embodiment, a secure data device is used as a safe deposit box used by a bank, where the secure data device is configured a pre-stored location indicating the street address of a bank branch and the bank's safe room at the branch, and wherein the secure data is an instruction to open the safe deposit box. In one embodiment, the safe deposit box includes a computer and a storage drive allowing a bank customer to store important electronic documents or information such as password, will, Bitcoins, electronic arts, or other valuable electronic data. In one embodiment, secure data device is used as a safe transport device, where the transport device is configured a pre-stored location of the trunk of an assigned vehicle, and a location of a destination office, where the transport device can be opened or used when it is in the location of the destination office in the trunk of the vehicle. The transport device may include a locked storage or a disk drive. In one embodiment, the transport device is configured with a pre-stored location of several wireless access points of the vehicle and/or the destination office. In one embodiment, the pre-stored location includes a manager office room number in the destination office.

In one embodiment, a secure data device is used as a sentry or safe in a house, where a user configures a pre-stored location of the street address of the house and a closet in the house. In one embodiment, the user has a wireless access point in the closet and configures the pre-stored location to include the wireless access point with a strong signal strength value to indicate a short distance away from the wireless access point. In one embodiment, the user can store valuable goods, important printed documents and important electronic documents in the secure data device.

In one embodiment, a secure data device is used in a cashier box, an electronic fund transfer (EFT) device, a point of sale (POS) device, or other secure device in a company. The secure data device can protect physical goods, cash, electronic documents, electronic data such as credit card information, eWallet information, passwords, or other electronic financial and legal documents. In this embodiment, the secure data device is configured with a pre-stored location of one or more locations of the company.

In one embodiment, a secure data device is used as a corporate secure key or datastore device. In one embodiment, the secure data device is configured with a pre-stored location of an employee and/or a wireless access point of a laptop. The secure data device can only reveal secure data when it is close to the laptop. Optionally the secure data device can only reveal secure data when it is used in designated locations such as home of the employee, 3 miles radius of employee's residence of the company office.

In one embodiment, a secure data device is used as a sentry device or safe in a hotel, where the secure data device is configured with a pre-stored location of a wireless access point placed in a hotel room key, or a smartphone. The secure data device is intended to be used only when a hotel guest is in the room with the room key or with the smartphone.

In one embodiment, a secure data device is used as a safe in a room of a cruise, where the secure data device is configured with a pre-stored location of the room, a location of the departing port, and possibly one or more locations of visiting ports.

In one embodiment, a secure data device is used in a rental computing device where the secure data device is configured with a pre-stored location of one or more designated usage locations. In one embodiment, the rental computing device is a tablet of a public library provided to a library patron, a rental game console, a rental point of sales device, a rental laptop in a conference, a rental tablet in a hotel, a rental media player in a theme park, a rental safe, a rental computer, a rental car, a rental bike, or other rental or leased electronic equipment.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer usable or compute readable storage medium providing program code for use by or in connection with a computer or any instruction execution system. For the purposes of this description, a computer usable or computer readable storage medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R'W) and DVD. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A secure transport device, comprising:
   a hardware storage;
   a physical lock coupled to the hardware storage;
   a data storage residing within the hardware storage, the data storage comprising a destination location comprising a first geophysical location;
   one or more processors; and
   a non-transitory computer readable medium comprising programming instructions, wherein when executed by the one or more processors, causes the one or more processors to:
   (a) receive an access request to access the hardware storage;
   (b) obtain a current location of the secure transport device, the current location comprising a second geophysical location, comprising:
      (b1) connect to a first set of wireless access points; and
      (b2) receive a first set of wireless access point identifies associated with the first set of wireless access points, the second geophysical location comprising the first set of wireless access point identities;
   (c) compare the first geophysical location to the second geophysical location; and
   (d) upon determining that the second geophysical location matches the first geophysical location:
      (d1) send a command to unlock the physical lock to allow access to the hardware storage; and
      (d2) store the access request and the current location in the data storage.

2. The device of claim 1, wherein the first geophysical location comprises a second set of wireless access point identities, wherein the compare (c) the upon determining (d) comprise:
   (c1) compare the first set of wireless access point identities with the second set of wireless access point identities; and
   (d3) when at least one of the first set of wireless access point identities match at least one of the second set of wireless access point identities, determine that the second geophysical location matches the first geophysical location.

3. The device of claim 1, wherein the first geophysical location comprises a first relative location defined relative to a second set of wireless access point identities, wherein the obtain (b), the compare (c), and the upon determining (d) comprise:
   (b3) calculate a second relative location defined relative to the first set of wireless access point identities;
   (c1) compare the second relative location and the first relative location; and
   (d3) when the second relative location matches the first relative location, determine that the second geophysical location matches the first geophysical location.

4. The device of claim 1, wherein the send (d1) comprises:
   (d1i) send the command to unlock the physical lock to allow access to a physical content in the hardware storage.

5. The device of claim 1, wherein the send (d1) comprises:
   (d1i) send the command to unlock the physical lock to allow access to the data storage in the hardware storage.

6. A method for secure hardware storage access, comprising:
   (a) receiving, by a secure transport device, an access request to access a hardware storage of the secure transport device, the hardware storage being coupled to a physical lock of the secure transport device, the secure transport device further comprising a data storage residing within the hardware storage, the data storage comprising a destination location comprising a first geophysical location;
   (b) obtaining a current location of the secure transport device, the current location comprising a second geophysical location, comprising:
      (b1) connecting to a first set of wireless access points; and
      (b2) receiving a first set of wireless access point identities associated with the first set of wireless access points, the second geophysical location comprising the first set of wireless access point identities;
   (c) comparing the first geophysical location to the second geophysical location; and
   (d) upon determining that the second geophysical location matches the first geophysical location:
      (d1) send a command to unlock the physical lock to allow access to the hardware storage; and
      (d2) store the access request and the current location in the data storage.

7. The method of claim 6, wherein the first geophysical location comprises a second set of wireless access point identities, wherein the comparing (c) the upon determining (d) comprise:
   (c1) comparing the first set of wireless access point identities with the second set of wireless access point identities; and
   (d3) when at least one of the first set of wireless access point identities match at least one of the second set of wireless access point identities, determining that the second geophysical location matches the first geophysical location.

8. The method of claim 6, wherein the first geophysical location comprises a first relative location defined relative to a second set of wireless access point identities, wherein the obtaining (b), the comparing (c), and the upon determining (d) comprise:

(b3) calculating a second relative location defined relative to the first set of wireless access point identities;
(c1) comparing the second relative location and the first relative location; and
(d3) when the second relative location matches the first relative location, determining that the second geophysical location matches the first geophysical location.

9. The method of claim 6, wherein the sending (d1) comprises:
(d1i) sending the command to unlock the physical lock to allow access to a physical content in the hardware storage.

10. The method of claim 6, wherein the sending (d1) comprises:
(d1i) sending the command to unlock the physical lock to allow access to the data storage in the hardware storage.

11. A non-transitory computer readable medium comprising programming instructions for secure hardware storage access, wherein when executed by a processor module implements a method comprising:
(a) receiving, by a secure transport device, an access request to access a hardware storage of the secure transport device, the hardware storage being coupled to a physical lock of the secure transport device, the secure transport device further comprising a data storage residing within the hardware storage, the data storage comprising a destination location comprising a first geophysical location;
(b) obtaining a current location of the secure transport device, the current location comprising a second geophysical location, comprising:
(b1) connecting to a first set of wireless access points; and
(b2) receiving a first set of wireless access point identities associated with the first set of wireless access points, the second geophysical location comprising the first set of wireless access point identities;
(c) comparing the first geophysical location to the second geophysical location; and
(d) upon determining that the second geophysical location matches the first geophysical location:
(d1) send a command to unlock the physical lock to allow access to the hardware storage; and
(d2) store the access request and the current location in the data storage.

12. The medium of claim 11, wherein the first geophysical location comprises a second set of wireless access point identities, wherein the comparing (c) the upon determining (d) comprise:
(c1) comparing the first set of wireless access point identities with the second set of wireless access point identities; and
(d3) when at least one of the first set of wireless access point identities match at least one of the second set of wireless access point identities, determining that the second geophysical location matches the first geophysical location.

13. The medium of claim 11, wherein the first geophysical location comprises a first relative location defined relative to a second set of wireless access point identities, wherein the obtaining (b), the comparing (c), and the upon determining (d) comprise:
(b3) calculating a second relative location defined relative to the first set of wireless access point identities;
(c1) comparing the second relative location and the first relative location; and
(d3) when the second relative location matches the first relative location, determining that the second geophysical location matches the first geophysical location.

14. The medium of claim 11, wherein the sending (d1) comprises:
(d1i) sending the command to unlock the physical lock to allow access to a physical content in the hardware storage.

15. The medium of claim 11, wherein the sending (d1) comprises:
(d1i) sending the command to unlock the physical lock to allow access to the data storage in the hardware storage.

16. A secure transport device, comprising:
a hardware storage;
a physical lock coupled to the hardware storage;
a data storage residing within the hardware storage, the data storage comprising a destination location comprising a first geophysical location;
one or more processors; and
a non-transitory computer readable medium comprising programming instructions, wherein when executed by the one or more processors, causes the one or more processors to:
(a) receive an access request to access the hardware storage;
(b) obtain a current location of the secure transport device, the current location comprising a second geophysical location;
(c) compare the first geophysical location to the second geophysical location;
(d) upon determining that the second geophysical location matches the first geophysical location:
(d1) send a command to unlock the physical lock to allow access to the hardware storage; and
(d2) store the access request and the current location in the data storage;
(e) upon determining that the second geophysical location does not match the first geophysical location, send a message indicating a failure of the access request to a network computer;
(f) track a number of failed access requests;
(g) determine whether the number of failed access requests exceeds a pre-determined number; and
(h) upon determining that the number of failed access requests exceeds the pre-determined number, not process any future access requests.

17. A method for secure hardware storage access, comprising:
(a) receiving, by a secure transport device, an access request to access a hardware storage of the secure transport device, the hardware storage being coupled to a physical lock of the secure transport device, the secure transport device further comprising a data storage residing within the hardware storage, the data storage comprising a destination location comprising a first geophysical location;
(b) obtaining a current location of the secure transport device, the current location comprising a second geophysical location;
(c) comparing the first geophysical location to the second geophysical location;
(d) upon determining that the second geophysical location matches the first geophysical location:
(d1) send a command to unlock the physical lock to allow access to the hardware storage; and
(d2) store the access request and the current location in the data storage;

(e) upon determining that the second geophysical location does not match the first geophysical location, sending a message indicating a failure of the access request to a network computer;
(f) tracking a number of failed access requests;
(g) determining whether the number of failed access requests exceeds a pre-determined number; and
(h) upon determining that the number of failed access requests exceeds the pre-determined number, not processing any future access requests.

18. A non-transitory computer readable medium comprising programming instructions for secure hardware storage access, wherein when executed by a processor module implements a method comprising:
(a) receiving, by a secure transport device, an access request to access a hardware storage of the secure transport device, the hardware storage being coupled to a physical lock of the secure transport device, the secure transport device further comprising a data storage residing within the hardware storage, the data storage comprising a destination location comprising a first geophysical location;
(b) obtaining a current location of the secure transport device, the current location comprising a second geophysical location;
(c) comparing the first geophysical location to the second geophysical location;
(d) upon determining that the second geophysical location matches the first geophysical location:
 (d1) send a command to unlock the physical lock to allow access to the hardware storage; and
 (d2) store the access request and the current location in the data storage;
(e) upon determining that the second geophysical location does not match the first geophysical location, sending a message indicating a failure of the access request to a network computer;
(f) tracking a number of failed access requests;
(g) determining whether the number of failed access requests exceeds a pre-determined number; and
(h) upon determining that the number of failed access requests exceeds the pre-determined number, not processing any future access requests.

* * * * *